United States Patent [19]

Tarascon

[11] Patent Number: 5,266,299
[45] Date of Patent: Nov. 30, 1993

[54] METHOD OF PREPARING LI1+XMN2O4 FOR USE AS SECONDARY BATTERY ELECTRODE

[75] Inventor: Jean-Marie Tarascon, Martinsville, N.J.

[73] Assignee: Bell Communications Research, Inc., Livingston, N.J.

[21] Appl. No.: 987,525

[22] Filed: Dec. 8, 1992

Related U.S. Application Data

[62] Division of Ser. No. 646,694, Jan. 28, 1991, Pat. No. 5,196,279.

[51] Int. Cl.$^5$ .................. C01G 45/12; H01M 4/50
[52] U.S. Cl. ................... 423/599; 429/224
[58] Field of Search ........... 423/599, 504, 505; 429/224; 252/518

[56] References Cited

U.S. PATENT DOCUMENTS

| | | |
|---|---|---|
| 4,133,856 | 1/1979 | Ikeda et al. .................. 423/599 |
| 4,828,834 | 5/1989 | Nagaura et al. ............... 429/194 |
| 4,956,248 | 9/1990 | Furukawa et al. ............. 429/224 |
| 4,975,346 | 12/1990 | Lecerf et al. ................. 429/224 |
| 5,135,732 | 8/1992 | Barboux et al. .............. 423/599 |
| 5,166,012 | 11/1992 | Rossouw et al. .............. 423/599 |
| 5,196,279 | 3/1993 | Tarascon ..................... 429/218 |

OTHER PUBLICATIONS

Grant & Hackh's Chemical Dictionary, 5th edition, 1987, pp. 352-353.

*Primary Examiner*—Gary P. Straub
*Assistant Examiner*—Steven Bos
*Attorney, Agent, or Firm*—Leonard Charles Suchyta; Lionel N. White

[57] ABSTRACT

A method of preparing a $Li_{1+1}Mn_2O_4$ ($0<x<1$) intercalation compound useful as a positive intercalation electrode in a lithium metal free non-aqueous secondary battery comprises reacting $LiMn_2O_4$ or $\lambda$-$MnO_2$ with LiI in an evacuated container at about 150° C. or with reflux in acetonitrile.

2 Claims, 2 Drawing Sheets

METHOD OF PREPARING LI1+XMN2O4 FOR USE AS SECONDARY BATTERY ELECTRODE

CROSS-REFERENCE TO RELATED APPLICATION

This application is a division of Ser. No. 07/646,694, filed Jan. 28, 1991.

BACKGROUND OF THE INVENTION

The present invention relates to rechargeable, secondary batteries comprising a lithium manganese oxide as the positive electrode. More particularly, the invention provides a method for the low temperature synthesis of lithium manganese oxides of the formula $Li_{1+x}Mn_2O_4$ where x ranges from 0 to 1.

Lithium manganese oxides have proven particularly useful as positive intercalation electrode materials in secondary batteries comprising negative electrodes of intercalatable materials, such as carbon in the form of graphite or petroleum coke, in lieu of potentially hazardous free lithium metal. Such a battery is in the discharged state when assembled, since only upon being charged does the negative electrode intercalate lithium ions from the positive electrode. During subsequent discharge of the battery, the lithium ions return to the positive electrode where they remain intercalated until the charging step of the next cycle. This shuttling of the lithium ions between electrodes during the charge-discharge cycling has led to the concept of the "rocking chair" battery.

Due to the loss of intercalatable lithium ions in certain irreversible secondary reactions, particularly during the first charging cycle, an excess of lithium is required in these cells in order to maintain a useful energy level. An immediate solution to this problem is to include an excess of lithium source positive electrode material. This expedient results in a significant loss of cell capacity, however. The more desirable alternative is to use as the positive electrode a compound which contains a greater amount of lithium per unit formula, thus offering a larger lithium reservoir without affecting cell capacity. The present invention provides a convenient method for the relatively low temperature synthesis of high quality lithium manganese oxides containing up to about two atoms of lithium per unit formula. When used as positive electrodes in "rocking chair", type secondary cells, these materials can double the cell capacity and yield increased energy density.

SUMMARY OF THE INVENTION

Lithium manganese oxides of the general formula $Li_{1+x}Mn_2O_4$ where x ranges from 0 to 1 are prepared by subjecting $LiMn_2O_4$ or $\lambda$-$MnO_2$ (e.g., $Mn_2O_4$) to a mildly reducing reaction with LiI whose redox potential of 2.8 volts is similar to the potential at which the $LiMn_2O_4 \rightarrow Li_2Mn_2O_4$ phase transformation occurs electrochemically. The reaction may be carried out at near ambient conditions in an evacuated sealed ampoule at about 150° C. or with reflux in an acetonitrile solvent at about 82° C., the ebullition temperature of acetonitrile.

BRIEF DESCRIPTION OF THE DRAWING

The present invention will be described with reference to the accompanying drawing of which.

DESCRIPTION OF THE INVENTION

In the first of alternative procedures for preparing the high lithium content manganese oxides according to the invention, $LiMn_2O_4$ which may be prepared according to any common procedure, e.g, by reacting mixed $Li_2CO_3$ and $MnO_2$ powders at about 800° C., was mixed as a powder in about a 1:1 weight ratio with LiI powder (i.e., LiI in excess) and placed in an evacuated and sealed ampoule which was subsequently heated at about 150° C. During the next few hours, the resulting reaction of the components proceeded as:

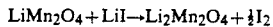

in which the $LiMn_2O_4$ was reduced by the LiI, as evidenced by the iodine coloration.

After about 24 hours of reaction, one end of the ampoule was cooled to room temperature in order to allow iodine to condense apart from the reacted material. The tube was then opened to yield a loose brown powder which was washed with a suitable solvent, such as acetonitrile, to remove remaining traces of unreacted LiI. X-ray diffraction and chemical analysis of the powder confirmed that the material was $Li_2Mn_2O_4$.

An alternative, simpler, and more convenient technique for preparing the $Li_2Mn_2O_4$ electrode material comprised heating the $LiMn_2O_4$ phase compound in an acetonitrile solution of the LiI reaction component. After two days of reaction at the fixed reflux temperature of approximately 82° C. (the ebullition temperature of acetonitrile), the reaction mixture was filtered and washed with acetonitrile. X-ray diffraction analysis confirmed that the resulting material was $Li_2Mn_2O_4$. This material proved to be stable in ambient environment for several days. A repeat of this process with $\lambda$-$MnO_2$ instead of $LiMn_2O_4$ produced the same $Li_2Mn_2O_4$ material, as did a similar repeat of the earlier-described dry heating process.

Figure 1:
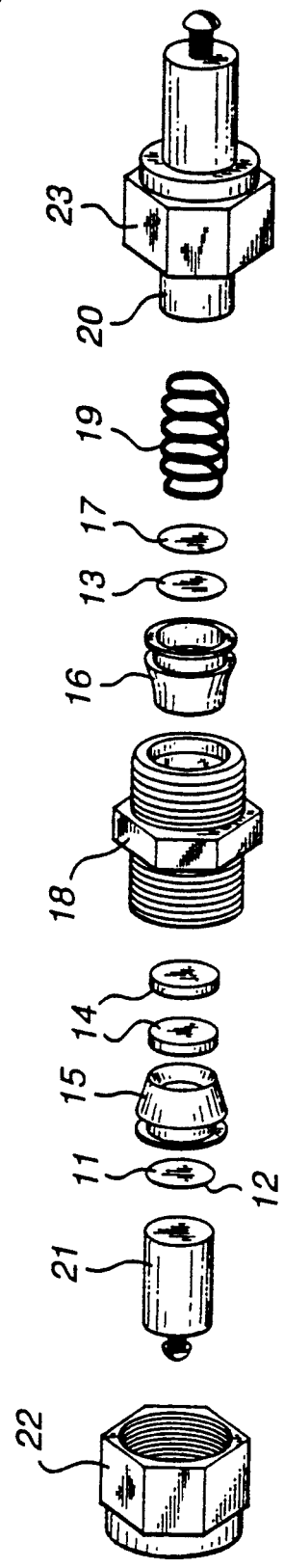
FIG. 1 is an exploded view of a typical test cell arrangement for determining the efficacy of secondary lithium cell component materials such as prepared according to the present invention.
Figure 2:
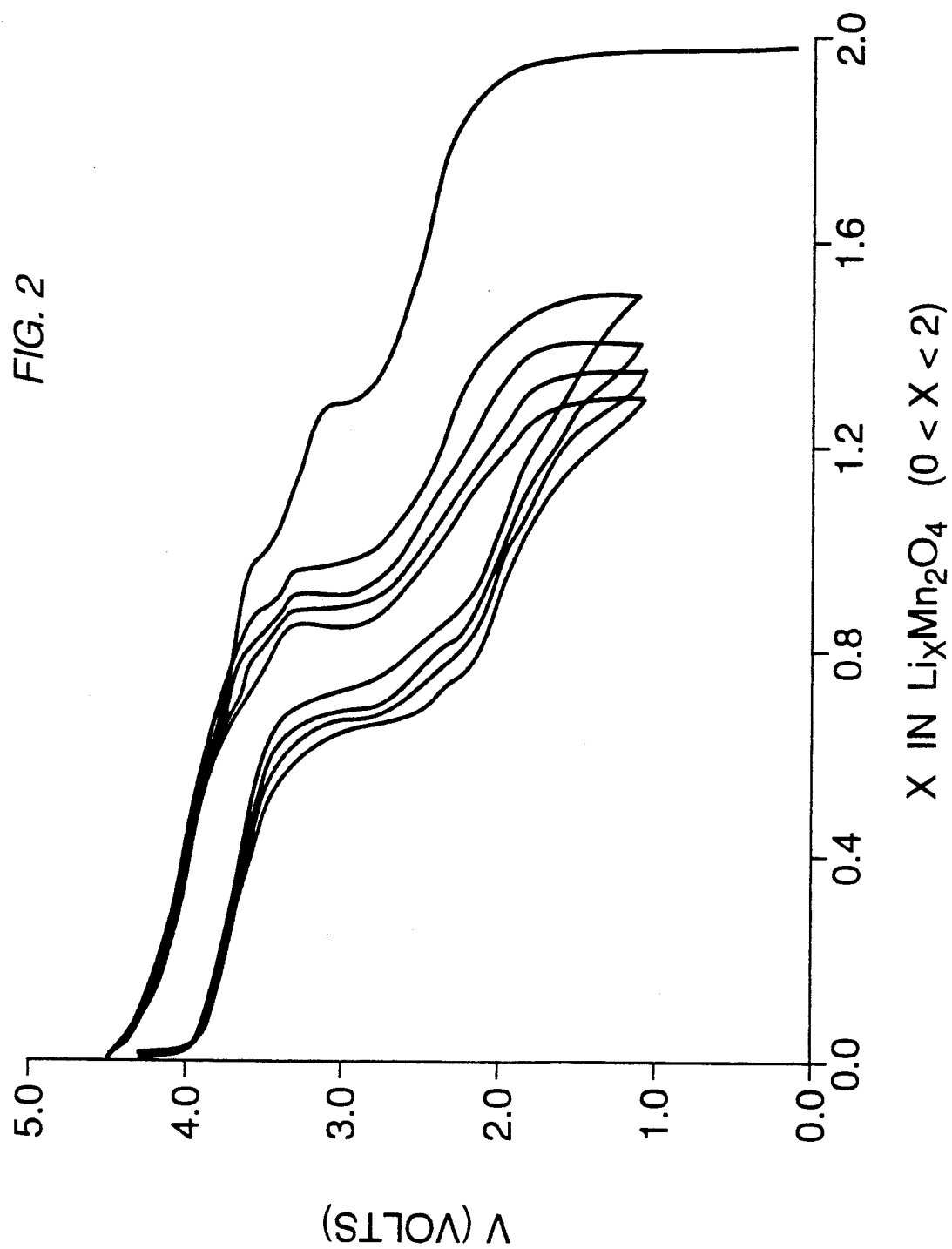
FIG. 2 is a graphical representation on coordinates of lithium atoms, x, in $Li_xMn_2O_4$ against voltage showing the cycling characteristics between 1 and 4.5 volts at a current density of 0.6 MA/cm² for a lithium secondary battery assembled with a positive intercalatable electrode material prepared according to the present invention to have a lithium content of about two atoms per unit formula.

Samples of the lithium manganese oxide prepared in accordance with the described techniques were formed into positive secondary cell electrodes by mixing with a small amount of carbon black (about 10% by weight) and a binder and pressing into wafers which were then heated at about 300°0 to 350° C. for about 50 to 60 minutes. These electrode elements were tested in the usual manner in Swagelok electrochemical test cells such as depicted in FIG. 1. Such cells were assembled in a helium atmosphere using a $Li_2Mn_2O_4$ wafer positive electrode 11 with a conductive backing disc 12 separated from a graphite wafer negative electrode 13 with steel conductive backing disc 17 by porous glass paper wafers 14 saturated with an electrolyte comprising a mixture of 1 molar $LiClO_4$ and 1 molar 12-Crown-4 ether dissolved in propylene carbonate. These active cell elements were pressed into intimate contact by the cooperative assembly of the remaining test cell elements including body member 18 and threaded cap members 22, 23 which tightly encompass stainless steel plunger rods 20, 21, spring 19, polypropylene fittings 15, 16, and other necessary insulating elements.

The test cells were then evaluated to determine the behavior of cell voltage for charge-discharge cycles as a function of the change in lithium atom content per formula unit during the progressive reversible transformation of $Li_2Mn_2O_4$. The characteristics of such cycling are shown in FIG. 3 for the first four charge-discharge cycles of a typical test cell. It can be seen there that when charging is initiated (i.e., with cell voltage $\approx 0$), the manganese begins to reduce and lithium ions intercalate the carbon electrode. The process proceeds until a voltage of about 4.5 volts is reached, a potential at which substantially all of the two lithium atoms have been transferred to the carbon anode. The cell was then discharged and recharged several times.

As is apparent from the cell behavior trace, despite the significant irreversible loss of lithium due to secondary reactions during the first charging, the cell remained capable of reversibly intercalating about 1.4 Li atoms per formula unit through use the synthesized $Li_2Mn_2O_4$ electrode material when the cells were cycled between about 4.5 volts and 1 volt. As a result, the cell capacity was substantially greater than that of any cell utilizing previously available $LiMn_2O_4$ intercalation electrodes.

What is claimed is:

1. A method of preparing a lithium manganese oxide intercalation compound of the formula $Li_{1+x}Mn_2O_4$ wherein $0 < x \leq 1$, which method comprises heating in a sealed evacuated container at a temperature of about 150° C., a mixture of lithium iodide and a manganese oxide compound selected from the group consisting of $\lambda\text{-}MnO_2$ and $LiMn_2O_4$ to form said intercalation compound.

2. A method of preparing a lithium manganese oxide intercalation compound of the formula $Li_{1+x}Mn_2O_4$ wherein $0 < x \leq 1$, which method comprises refluxing, in acetonitrile, a mixture of lithium iodide and a manganese compound selected from the group consisting of $\lambda\text{-}MnO_2$ and $LiMn_2O_4$ to form said intercalation compound.

* * * * *